(12) United States Patent
Shknevsky et al.

(10) Patent No.: US 12,468,458 B1
(45) Date of Patent: Nov. 11, 2025

(54) FLUSHING DIRECTLY INGESTED USER DATA

(71) Applicant: Dell Products L.P., Round Rock, TX (US)

(72) Inventors: Alexander Shknevsky, Fair Lawn, NJ (US); Vamsi K. Vankamamidi, Hopkinton, MA (US); Oran Baruch, Tel Aviv (IL); Maor Rahamim, Ramla (IL); Kurt W. Everson, Richmond, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/794,078

(22) Filed: Aug. 5, 2024

(51) Int. Cl.
*G06F 3/06* (2006.01)

(52) U.S. Cl.
CPC .......... *G06F 3/0631* (2013.01); *G06F 3/0619* (2013.01); *G06F 3/0688* (2013.01)

(58) Field of Classification Search
CPC ..... G06F 3/0631; G06F 3/0619; G06F 3/0688
See application file for complete search history.

(56) References Cited

U.S. PATENT DOCUMENTS

| | | | |
|---|---|---|---|
| 11,113,068 B1 | 9/2021 | Tekmen et al. | |
| 11,216,195 B1 * | 1/2022 | Armangau | G06F 12/0871 |
| 11,269,776 B2 | 3/2022 | Chen et al. | |
| 11,397,669 B2 | 7/2022 | Chung | |
| 11,720,490 B2 | 8/2023 | Chen et al. | |
| 2022/0091976 A1 * | 3/2022 | Soukhman | G06F 12/0822 |

* cited by examiner

*Primary Examiner* — Jason W Blust
(74) *Attorney, Agent, or Firm* — BainwoodHuang

(57) ABSTRACT

For a flush request for a first block of user data directly stored into a physical block of non-volatile data storage, allocating a virtual layer block, and storing, in the virtual layer block, a first set of virtual block pointers indicating pages of the first block within the physical block. Pointers to the virtual block pointers in the first set are then stored into a leaf layer of a logical address mapping tree. The virtual layer block is identified for a subsequent flush request issued for a second block of user data directly stored into the physical block, and a second set of virtual block pointers indicating pages of the second block within the physical block is stored in the virtual layer block. Pointers to the virtual block pointers in the second set are stored into a leaf layer node of another logical address mapping tree.

19 Claims, 7 Drawing Sheets

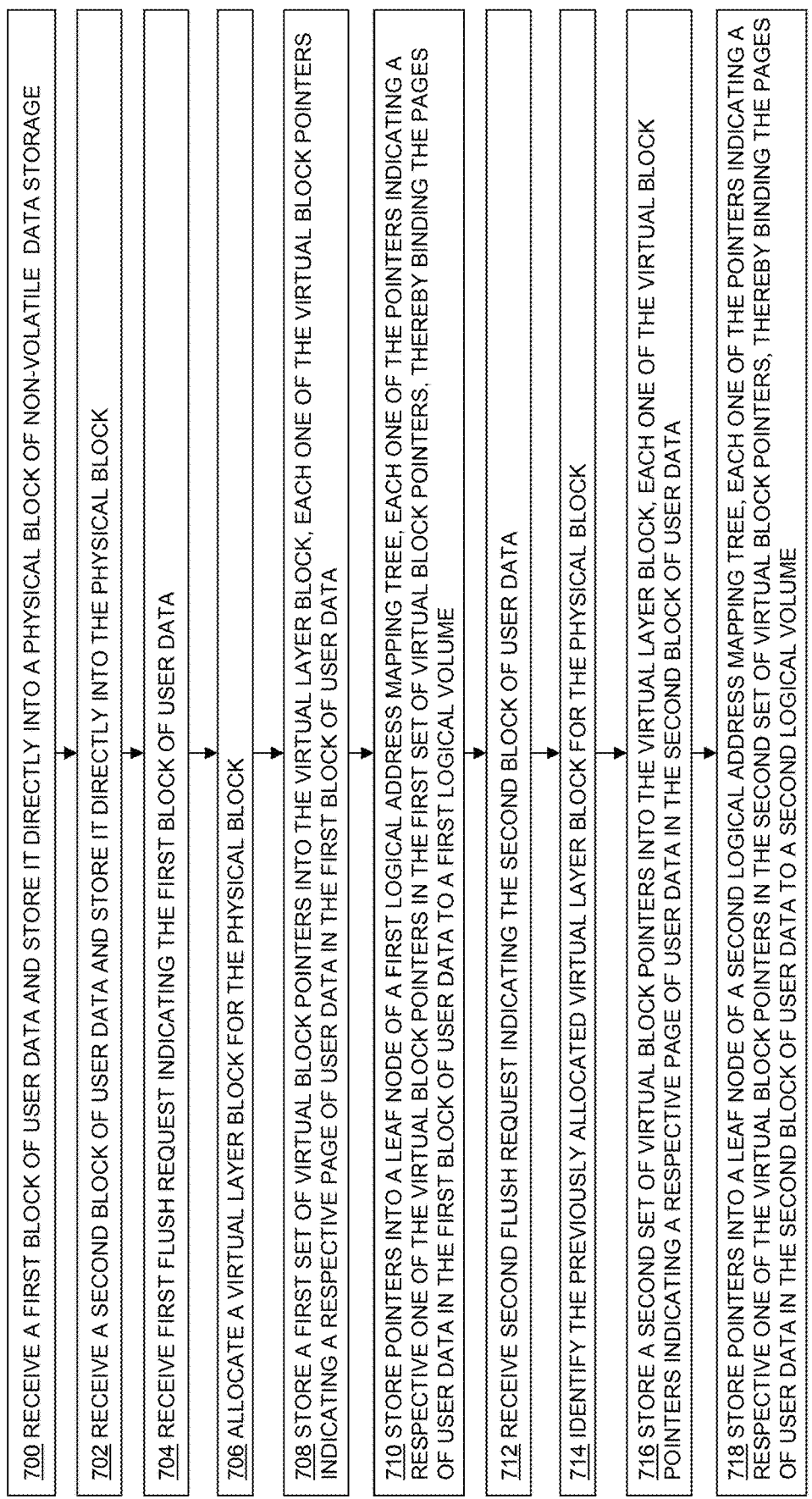

FLUSHING DIRECTLY INGESTED USER DATA

TECHNICAL FIELD

The present disclosure relates generally to technology for flushing user data received by a data storage system, and more specifically to technology for flushing directly ingested user data.

BACKGROUND

Data storage systems are arrangements of hardware and software that are coupled to non-volatile data storage drives, such as solid-state drives and/or magnetic disk drives. The data storage system services host I/O requests received from physical and/or virtual host machines ("hosts"). The host I/O requests received by the data storage system specify user data that is written and/or read by the hosts. The data storage system executes software that processes the host I/O requests by performing various data processing tasks to efficiently organize and persistently store the user data in the non-volatile data storage drives of the data storage system.

When processing a host I/O write request, a data storage system may initially store the user data indicated by the request temporarily in a non-volatile cache (or log). After the user data is successfully stored in this way, the data storage system can send an acknowledgement message to the host that issued the request indicating that the host data has been securely stored. At a subsequent point in time, the cached user data will be "flushed" from the cache into the non-volatile data storage of the data storage system.

SUMMARY

In the disclosed technology, a first flush request is received, indicating a first block of user data to be flushed. In response to detecting that the first block of user data was, when it was received, directly stored into a physical block of non-volatile data storage, the disclosed technology detects whether the first flush request is an initial flush request indicating user data directly stored into the physical block of non-volatile data storage. In response to detecting that the first flush request is the initial flush request indicating user data directly stored into the physical block of non-volatile data storage, a virtual layer block is allocated for the physical block of non-volatile data storage. The disclosed technology stores, within the virtual layer block, a first set of virtual block pointers. The virtual block pointers in the first set of virtual block pointers indicate locations of respective pages of the first block of user data within the physical block of the non-volatile data storage. The disclosed technology stores, in at least one leaf layer node of a first logical address mapping tree, pointers to the virtual block pointers in the first set of virtual block pointers stored in the virtual layer block.

In some embodiments, a second flush request is received, indicating a second block of user data to be flushed. In response to detecting that the second block of user data was, when it was received, directly stored into the physical block of non-volatile data storage, the disclosed technology detects whether the second flush request is the initial flush request indicating user data directly stored into the physical block of non-volatile data storage. In response to detecting that the second flush request is not the initial flush request indicating user data directly stored into the physical block of non-volatile data storage, the disclosed technology identifies the virtual layer block previously allocated for the physical block of non-volatile data storage. The disclosed technology then stores, in the virtual layer block, a second set of virtual block pointers. The virtual block pointers in the second set of virtual block pointers indicate locations of respective pages of the second block of user data within the physical block of the non-volatile data storage. The disclosed technology stores, in at least one leaf layer node of a second logical address mapping tree, pointers to the virtual block pointers in the second set of virtual block pointers stored in the virtual layer block.

In some embodiments, the first block of user data was received in a first host I/O write request directed to a first logical volume, and the first logical address mapping tree maps logical block addresses in the first logical volume to locations in the non-volatile data storage. In such embodiments, the second block of user data may be received in a second host I/O write request directed to a second logical volume, and the second logical address mapping tree maps logical block addresses in the second logical volume to locations in the non-volatile data storage.

In some embodiments, storing, in the leaf layer node of the first logical address mapping tree, the pointers to the virtual block pointers in the first set of virtual block pointers stored in the virtual layer block, enables access to the pages of the first block of user data within the physical block of the non-volatile data storage using respective ones of the logical block addresses in the first logical volume. In such embodiments, storing, in the leaf layer node of the second logical address mapping tree, the pointers to the virtual block pointers in the second set of virtual block pointers stored in the virtual layer block, may similarly enable access to the pages of the second block of user data within the physical block of the non-volatile data storage using respective ones of the logical block addresses in the second logical volume.

In some embodiments, the disclosed technology directly stores the first block of user data into the physical block of non-volatile data storage in response to detecting that a size of the first block of user data is at least as large as a minimum threshold. In such embodiments, the second block of user data is also directly stored into the physical block of non-volatile data storage in response to detecting that a size of the second block of user data is at least as large as the minimum threshold.

In some embodiments, directly storing the first block of user data and the second block of user data into the physical block of non-volatile data storage bypasses a non-volatile cache.

In some embodiments, the non-volatile data storage may be configured as a RAID (Redundant Array of Independent Disks), and the physical block of non-volatile data storage is a single RAID stripe.

In some embodiments, when the second flush request is received, indicating a second block of user data to be flushed, and the second block of user data was, when it was received, also stored directly into the physical block of non-volatile data storage, the disclosed technology operates in response to detecting an error in metadata for the physical block of non-volatile data storage, by allocating a new physical block of non-volatile data storage, and moving the user data stored in the physical block of non-volatile data storage to the new physical block of non-volatile data storage. The disclosed technology marks the physical block of non-volatile data storage with a "known bad" status indicator. The metadata for the physical block of non-volatile data storage may include a virtual layer block and physical block descriptor for the physical block of non-volatile data storage, and a new virtual layer block and a new physical block descriptor may be allocated for the new physical block of non-volatile data storage.

The disclosed technology is integral to providing a practical technical solution to the problem of flushing host data that was directly ingested into the non-volatile data storage of a data storage system. A data storage system may initially ingest host data that is received in host I/O requests having sizes at least as large as a predetermined threshold directly into the non-volatile data storage, while other received host data is initially ingested into a cache or log (e.g. as maintained in a non-volatile memory or the like), and the later de-staged to the non-volatile data storage. When the flush logic of such a data storage system operates on host data that was directly ingested into the non-volatile data storage, it should maintain the ingested host data at the location where it was initially stored into the non-volatile data storage, while also making it accessible through logical addresses, e.g. logical block addresses or the like. The disclosed technology makes the directly ingested host data accessible through logical block addresses that are mapped to individual pages of the directly ingested host data within the physical block into which the host data was directly ingested upon receipt. Advantageously, the directly ingested host is not copied or moved after it is directly ingested, except when necessitated during error handling.

The foregoing summary does not indicate required elements, or otherwise limit the embodiments of the disclosed technology described herein. The technical features described herein can be combined in any specific manner, and all combinations may be used to embody the disclosed technology.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

FIG. 7 is a flow chart illustrating steps performed in some embodiments.

DETAILED DESCRIPTION

Figure 1:
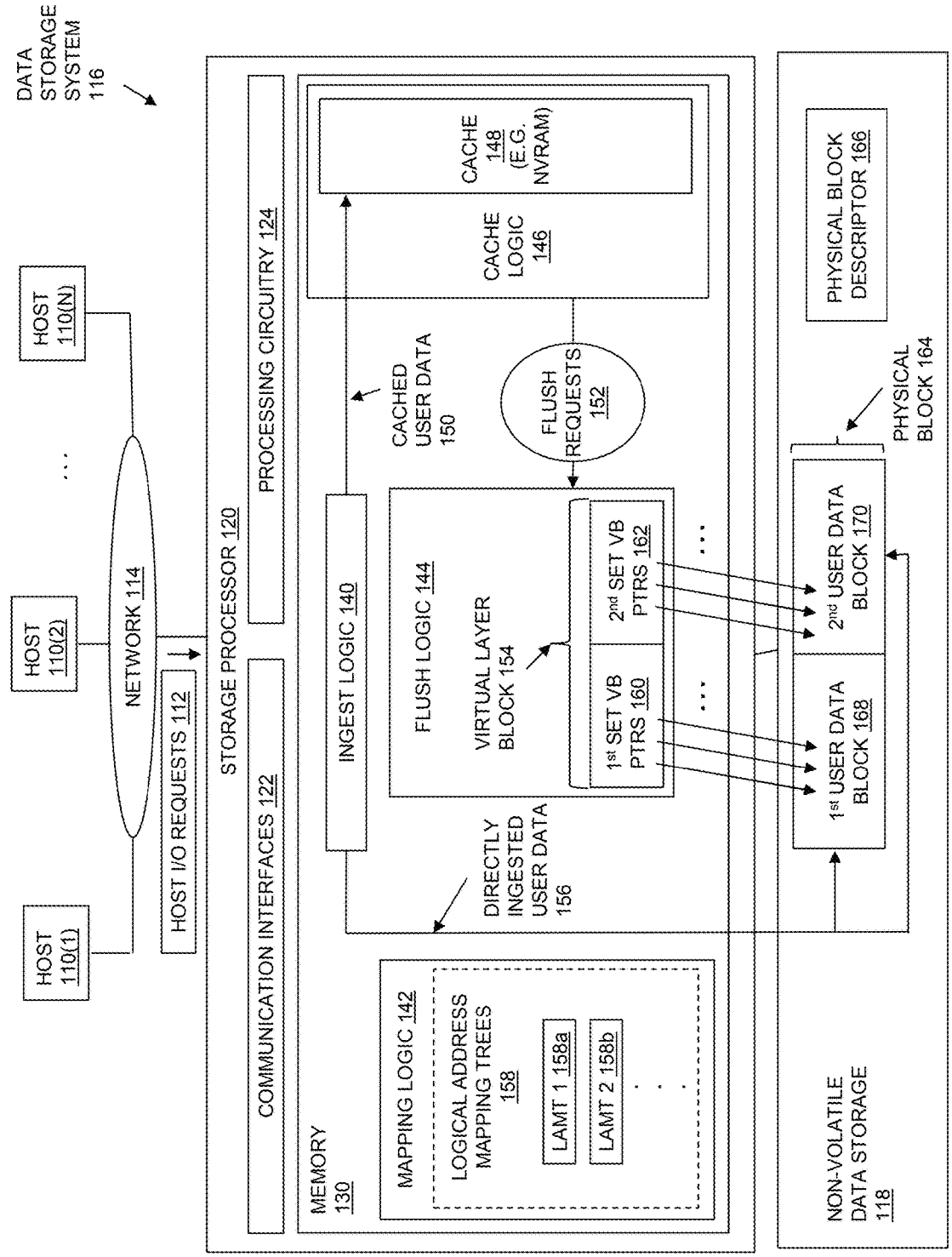
FIG. 1 is a block diagram showing an illustrative embodiment of the disclosed technology.

Embodiments will now be described with reference to the figures. The embodiments described herein are not limiting, and are provided only as examples, to illustrate various features and principles of the disclosed technology. The embodiments of disclosed technology described herein are integrated into a practical solution to the problem of flushing host data that was directly ingested into the non-volatile data storage of a data storage system.

The disclosed technology operates when a first flush request is received that indicates a first block of user data to be flushed, and in response to detecting that the first block of user data was, when it was received, directly stored into a physical block of non-volatile data storage. The disclosed technology detects whether the first flush request is an initial flush request indicating user data directly stored into the physical block of non-volatile data storage. In response to detecting that the first flush request is the initial flush request indicating user data directly stored into the physical block of non-volatile data storage, a virtual layer block is allocated for the physical block of non-volatile data storage. A first set of virtual block pointers is then stored within the virtual layer block. The virtual block pointers in the first set of virtual block pointers indicate locations of respective pages of user data within the first block of user data, as stored in the physical block of the non-volatile data storage. Pointers to the virtual block pointers in the first set of virtual block pointers in the virtual layer block are then stored in at least one leaf layer node of a first logical address mapping tree. A second flush request is received, indicating a second block of user data to be flushed. In response to detecting that the second block of user data was, when it was initially received, stored directly into the physical block of non-volatile data storage, the disclosed technology detects whether the second flush request is the initial flush request indicating user data directly stored into the physical block of non-volatile data storage. In response to detecting that the second flush request is not the initial flush request indicating user data directly stored into the physical block of non-volatile data storage, the virtual layer block that was previously allocated for the physical block of non-volatile data storage is identified. A second set of virtual block pointers is then stored in the virtual layer block. The virtual block pointers in the second set of virtual block pointers indicate locations of respective pages of user data within the second block of user data, as stored in the physical block of the non-volatile data storage. Pointers to the virtual block pointers in the second set of virtual block pointers stored in the virtual layer block are then stored in at least one leaf layer node of a second logical address mapping tree.

The first block of user data may be received in a first host I/O write request directed to a first logical volume, and the first logical address mapping tree may map logical block addresses in the first logical volume to locations in the non-volatile data storage. Similarly, the second block of user data may be received in a second host I/O write request directed to a second logical volume, and the second logical address mapping tree may map logical block addresses in the second logical volume to locations in the non-volatile data storage.

Storing the pointers to the virtual block pointers in the first set of virtual block pointers in the virtual layer block into the leaf layer node of the first logical address mapping tree enables access to the pages of the first block of user data within the physical block of the non-volatile data storage using respective ones of the logical block addresses in the first logical volume. Storing the pointers to the virtual block pointers in the second set of virtual block pointers in the virtual layer block into the leaf layer node of the second logical address mapping tree enables access to the pages of the second block of user data within the physical block of the non-volatile data storage using respective ones of the logical block addresses in the second logical volume.

The first block of user data may be stored directly into the physical block of non-volatile data storage in response to detecting that the size of the first block of user data is at least as large as a minimum threshold. The second block of user data may also be stored directly into the physical block of non-volatile data storage in response to detecting that the size of the second block of user data is at least as large as the minimum threshold.

Directly storing the first block of user data and the second block of user data into the physical block of non-volatile data storage may bypass a non-volatile cache or log.

The non-volatile data storage may be configured as a RAID (Redundant Array of Independent Disks), and the physical block of non-volatile data storage may be a single RAID stripe.

When the second flush request is received, indicating the second block of user data to be flushed, and where the second block of user data was, when it was received, also stored directly into the physical block of non-volatile data storage, in response to detecting an error in the metadata for the physical block of non-volatile data storage, some embodiment of the disclosed technology may perform error processing by i) allocating a new physical block of non-volatile data storage, and ii) moving the user data stored in the physical block of non-volatile data storage to the new physical block of non-volatile data storage. The physical block of non-volatile data storage is then marked with a "known bad" status indicator. The metadata for the physical block of non-volatile data storage may include a virtual layer block and physical block descriptor for the physical block of non-volatile data storage. A new virtual layer block and a new physical block descriptor may be allocated for the new physical block of non-volatile data storage.

FIG. 1 shows an example of an operational environment in which embodiments of the disclosed technology may operate, and an illustrative embodiment of the disclosed technology. As shown in FIG. 1, one or more host computers ("Hosts"), shown as host computers 110(1) through 110(N), and/or host applications executing in whole or in part on host computers 110(1) through 110(N), access non-volatile data storage provided by Data Storage System 116 over a Network 114. Data Storage System 116 includes at least one Storage Processor 120 and Non-Volatile Data Storage 118. Data Storage System 116 may include one or more storage processors like Storage Processor 120. Storage Processor 120 may be any type of physical or virtual computing device that is capable of processing host I/O requests.

Non-Volatile Data Storage 118 may include or consist of solid-state drives (SSDs), or some other specific type of storage drives, such as magnetic disk drives, electronic flash drives, optical drives, and/or other specific types of non-volatile data storage drives or devices.

Network 114 may include or consist of any specific type of computer/communication network and/or combination of networks.

Hosts 110(1-N) and/or host applications executing in whole or in part on Hosts 110(1-N) logically connect to and communicate with the Storage Processor 120. For example, Host I/O Requests 112 conveyed from Hosts 110(1-N) to Storage Processor 120 may include block I/O requests and/or file I/O requests. Storage Processor 120 may be configured to receive host I/O requests through block-based and/or file-based storage protocols, and to respond to host I/O requests of either type by reading and/or writing the Non-Volatile Data Storage 118.

Storage Processor 120 may include one or more Communication Interfaces 122, Processing Circuitry 124, and Memory 130. Communication Interfaces 122 may include adapters that convert electronic and/or optical signals received over Network 114 into electronic form for use by Storage Processor 120.

Processing Circuitry 124 may be embodied as at least one processor core that is capable of independently reading and executing threads of program instructions as they are scheduled for execution. Processing Circuitry 124 may be integrated into a single central processing unit chip or chip package. Processing Circuitry 124 may be a subset of the processor cores contained in Storage Processor 120 or may be the only processor core contained in Storage Processor 120.

Memory 130 may include both volatile memory (e.g., RAM), and/or non-volatile memory (e.g. Non-Volatile RAM, ROM, disk drives, solid state drives, portions of Non-Volatile Storage 118, etc.).

Processing Circuitry 124 and Memory 130 together form specialized control circuitry, which is constructed and arranged to carry out the specific methods and functions described herein. As shown in FIG. 1, Memory 130 stores software components and data structures that may be provided at least in part in the form of executable program instructions. When the executable instructions of the software components shown in FIG. 1 are executed by Processing Circuitry 124, Processing Circuitry 124 performs the methods and functionality of the software. In the example of FIG. 1, for purposes of illustration, the software components in Memory 130 include Ingest Logic 140, Mapping Logic 142, Flush Logic 144, and Cache Logic 146.

Although certain specific software components are shown in FIG. 1, those skilled in the art will recognize that Memory 130 may further include various other specific software components, which are not shown, such as an operating system, etc.

During operation of the illustrative embodiment shown in FIG. 1, Ingest Logic 140 processes individual host I/O write requests that are received by Storage Processor 120 differently depending on the size of the block of user data that is to be written. In the case of each received host I/O write request that writes a block of user data having a size that is less than a minimum threshold (e.g. less than 1 MB), Ingest Logic 140 initially stores the received block of user data into Cache 148. Cache 148 may, for example, be made up of non-volatile RAM (NVRAM). Received user data that is initially stored by Ingest Logic 140 into Cache 148 is shown by Cached User Data 150. After a block of Cached User Data 150 is successfully stored in Cache 148, the corresponding host I/O write request can be acknowledged to the issuing host as having been successfully completed. User data that is initially stored in Cache 148 is subsequently de-staged ("flushed") by Flush Logic 144 from Cache 148 into physical blocks allocated in Non-Volatile Data Storage 118.

In the case of each host I/O write request that is received by Storage Processor 120 and that writes a block of user data having a size that is at least as large as a minimum threshold (e.g. at least 1 MB), Ingest Logic 140 bypasses Cache 148, and directly ingests the user data into a physical block allocated in Non-Volatile Data Storage 118. Received user data that is directly ingested by Ingest Logic 140 into Non-Volatile Data Storage 118 is shown by Directly Ingested User Data 156.

For example, a first block of user data having a size at least as large as the minimum threshold (e.g. a 1 MB block of user data) is received in a first host I/O write request that is directed to a first logical volume of data storage served by Data Storage System 116. In response to detecting that the size of the first block of user data is at least as large as the minimum threshold, Ingest Logic 140 stores the first block of user data directly into Physical Block 164 in Non-Volatile Data Storage 118, thus by-passing Cache 148. The first block of user data is shown in FIG. 1 by $1^{st}$ User Data Block 168, as stored by Ingest Logic 140 in Physical Block 164. After the first block of user data is successfully stored in Physical Block 165, an acknowledgement may be sent to the issuing host indicating that the first host I/O write request has been successfully completed.

A second block of user data also having a size at least as large as the minimum threshold (e.g. another 1 MB block of user data) is received in a second host I/O write request that is directed to a second logical volume of data storage served by Data Storage System 116. In response to detecting that the size of the second block of user data is at least as large as the minimum threshold, Ingest Logic 140 stores the second block of user data directly into Physical Block 164, again by-passing Cache 148. The second block of user data is shown in FIG. 1 by $2^{nd}$ User Data Block 170, as stored by Ingest Logic 140 in Physical Block 164.

Non-Volatile Data Storage 118 may be configured as a RAID (Redundant Array of Independent Disks), and Physical Block 164 may, for example, be a single RAID stripe, having a size of 2 MB.

Cache Logic 146 issues Flush Requests 152 to Flush Logic 144. Each flush request indicates a block of user data that is to be flushed. The block of user data indicated by an individual flush request may be either i) a block of cached user data that was, when it was received by Storage Processor 120, stored by Ingest Logic 140 into Cache 148, or ii) a block of directly ingested user data that was, when it was received by Storage Processor 120, stored by Ingest Logic 140 directly into Non-Volatile Data Storage 118. In the case of flush requests indicating cached user data, Flush Logic 144 performs actions including moving the user data from Cache 148 to Non-Volatile Data Storage 116. In the case of flush requests indicating directly ingested user data, Flush Logic 144 leaves the user data at the location in Non-Volatile Data Storage 118 to which it was directly ingested, while performing actions further described herein.

For example, a first flush request is received by Flush Logic 144, indicating a block of user data (e.g. the $1^{st}$ User Data Block 168) that is to be flushed. By determining that $1^{st}$ User Data Block 168 is located in Non-Volatile Data Storage 118, Flush Logic 144 detects that $1^{st}$ User Data Block 168 is directly ingested user data that was, when it was initially received by Storage Processor 120, stored directly into Physical Block 164 by Ingest Logic 140. Flush Logic 144 then detects whether the first flush request is the initial flush request indicating directly ingested user data stored into Physical Block 164, i.e. is the first flush request received by Flush Logic 144 indicating user data stored in Physical Block 164. To detect whether the first flush request is the initial flush request indicating user data stored directly into Physical Block 164, Flush Logic 144 may, for example, determine whether a virtual layer block has already been allocated for Physical Block 164. To determine whether a virtual layer block has already been allocated for Physical Block 164, Flush Logic 144 may examine the contents of a Physical Block Descriptor 166 corresponding to Physical Block 164. Physical Block Descriptor 166 is metadata associated with Physical Block 164. If Physical Block Descriptor 166 contains no pointer to a virtual layer block that was previously allocated for Physical Block 164, Flush Logic 144 detects that the first flush request is the initial flush request received by Flush Logic 144 indicating user data directly stored into Physical Block 164.

In response to detecting that the first flush request is the initial flush request indicating user data directly stored into Physical Block 164, Flush Logic 144 allocates a virtual layer block for Physical Block 164, e.g. Virtual Layer Block 154. Virtual Layer Block 154 is also metadata associated with Physical Bock 164. Flush Logic 144 stores a pointer indicating Virtual Layer Block 154 into Physical Block Descriptor 166. Flush Logic 144 also stores a set of virtual block pointers (e.g. $1^{st}$ Set of Virtual Block Pointers 160) within Virtual Layer Block 154. Each one of the virtual block pointers in $1^{st}$ Set of Virtual Block Pointers 160 indicates a location of a respective page of the user data within $1^{st}$ User Data Block 168, e.g. an offset of a respective 4 KB page of the user data within $1^{st}$ User Data Block 168, e.g. relative to the start of Physical Block 164.

Flush Logic 144 then stores pointers to the virtual block pointers in $1^{st}$ Set of Virtual Block Pointers 160 into at least one leaf layer node of a first logical address mapping tree, e.g. a leaf layer node in Logical Address Mapping Tree 158a in Logical Address Mapping Trees 158. By storing pointers that indicate the virtual block pointers in $1^{st}$ Set of Virtual Block Pointers 160 into the leaf layer node of Logical Address Mapping Tree 158a, Flush Logic 144 enables access to the pages of the $1^{st}$ User Data Block 168 within Physical Block 164 using respective ones of the logical block addresses in the first logical volume, thus binding the pages of user data in the $1^{st}$ User Data Block 168 to the logical block addresses of the first logical volume.

For example, Data Storage System 116 may serve multiple logical volumes of data storage to Hosts 110. Each logical volume may, for example, be used to store host data indicated by host I/O write requests and provide access to previously stored host data through host I/O read requests. For each such logical volume of data storage, a logical address mapping tree is maintained in Logical Address Mapping Trees 158. Mapping Logic 142 uses Logical Address Mapping Trees 158 to determine the specific physical locations within Non-Volatile Data Storage 118 of host data indicated by host I/O requests. Each logical address mapping tree maps logical block addresses in the corresponding logical volume to physical locations in Non-Volatile Data Storage 118. For example, to locate the physical location of a page of host data located within a specified logical volume of non-volatile data storage served by the data storage system, Mapping Logic 142 traverses the logical address mapping tree maintained for that logical volume in Logical Address Mapping Trees 158, using the logical block address of the desired page.

As described above, $1^{st}$ User Data Block 168 may be received in a first host I/O write request that is directed to a first logical volume. Logical Address Mapping Tree 158a may be maintained for that first logical volume, and therefore map logical block addresses of pages in the first logical volume to physical locations within Non-Volatile Data Storage 118. As also described above, $2^{nd}$ User Data Block 170 may be received in a second host I/O write request that is directed to a second logical volume. Logical Address Mapping Tree 158b may be maintained for the second logical volume, and map logical block addresses of pages in the second logical volume to physical locations within Non-Volatile Data Storage 118.

Flush Logic 144 receives a second flush request, indicating a block of user data (e.g. the $2^{nd}$ User Data Block 170) that is to be flushed. By determining that $2^{nd}$ User Data Block 170 is located in Non-Volatile Data Storage 118, Flush Logic 144 detects that $2^{nd}$ User Data Block 170 is directly ingested user data that was, when it was initially received by Storage Processor 120, stored directly into Physical Block 164 by Ingest Logic 140. Flush Logic 144 then detects whether the second flush request is the initial flush request indicating directly ingested user data stored into Physical Block 164. To detect whether the second flush request is the initial flush request indicating user data that was stored directly into Physical Block 164, Flush Logic 144 may, for example, determine whether a virtual layer block has already been allocated for Physical Block 164. To determine whether a virtual layer block has already been allocated for Physical Block 164, Flush Logic 144 may examine the contents of a Physical Block Descriptor 166 for Physical Block 164, to determine whether Physical Block Descriptor 166 contains a pointer to a virtual layer block that was previously allocated for the Physical Block 164. In this case, in response to determining that Physical Block Descriptor 166 stores a pointer to Virtual Layer Block 154, which was previously allocated for Physical Block 164, Flush Logic 144 detects that the second flush request is not the initial flush request indicating user data stored directly into Physical Block 164. Accordingly, no virtual layer block needs to be allocated for Physical Block 164. Instead, Flush Logic 144 identifies Virtual Layer Block 154 using the pointer to Virtual Layer Block 154 previously stored into Physical Block Descriptor 166. Flush Logic 144 then stores a second set of virtual block pointers (e.g. $2^{nd}$ Set of Virtual Block Pointers 162) within Virtual Layer Block 154. Each one of the virtual block pointers in $2^{nd}$ Set of Virtual Block Pointers 162 indicates a location of a respective one of the pages of user data within $2^{nd}$ User Data Block 170, e.g. an offset of a respective 4 KB page of the user data within $2^{nd}$ User Data Block 170, e.g. relative to the start of Physical Block 164.

Flush Logic 144 then stores pointers to the virtual block pointers in $2^{nd}$ Set of Virtual Block Pointers 162 in at least one leaf layer node of in at least one leaf layer node of a first logical address mapping tree, e.g. a leaf layer node in Logical Address Mapping Tree 158b in Logical Address Mapping Trees 158. By storing pointers that indicate the virtual block pointers in $2^{nd}$ Set of Virtual Block Pointers 162 into the leaf layer node of Logical Address Mapping Tree 158b, Flush Logic 144 enables access to the pages of the $2^{nd}$ User Data Block 170 within Physical Block 164 using respective ones of the logical block addresses in the second logical volume, thus binding the pages of user data in the $2^{nd}$ User Data Block 170 to the logical block addresses of the second logical volume.

In another example, when the second flush request is received, indicating $2^{nd}$ User Data Block 170 that is directly ingested host data to be flushed and was stored directly into Physical Block 164 when it was initially received, an error may be detected in the metadata for Physical Block 164. The metadata for Physical Block 164 includes Physical Block Descriptor 166 and Virtual Layer Block 154. An error may be detected when reading Physical Block Descriptor 166 during the processing of the second flush request, such as a data corruption error detected through checksum verification or the like. Similarly, an error may alternatively be detected when reading Virtual Layer Block 154 during the processing of the second flush request, again such as a data corruption error detected through checksum verification or the like. In such a case, Flush Logic 144 may perform error processing by i) allocating a new physical block within Non-Volatile Data Storage 118, and ii) moving the user data currently stored in Physical Block 164 to the new physical block. Physical Block 164 is then marked with a "known bad" status indicator, e.g. by storing a "known bad" status indicator in Physical Block Descriptor 166. Further during error processing, Flush Logic 144 may then allocate a new virtual layer block and a new physical block descriptor to be used with the new physical block.

Figure 2:
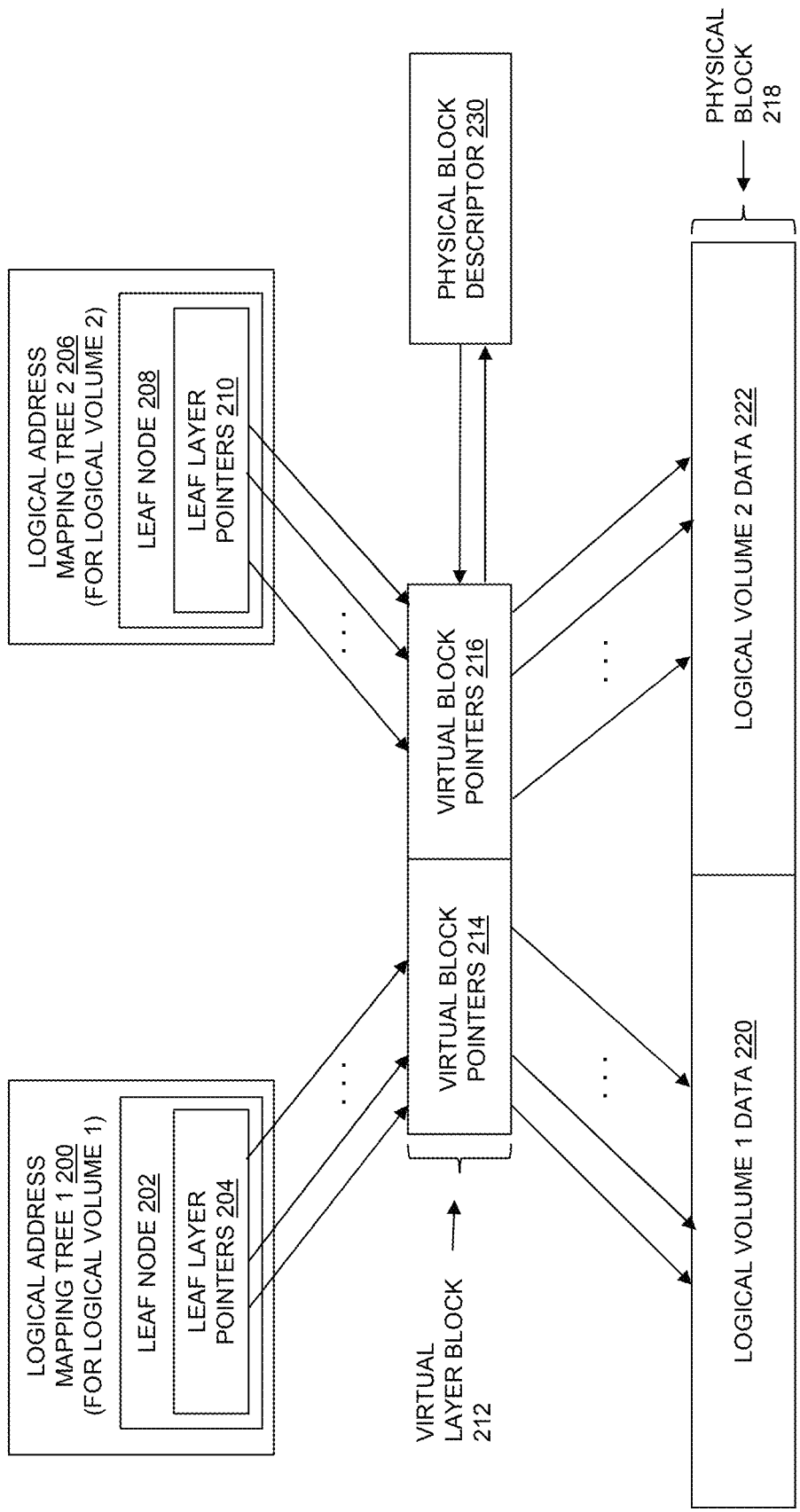
FIG. 2 is a block diagram showing operation of an illustrative embodiment of the disclosed technology.

FIG. 2 shows an example of the operation of an illustrative embodiment. In FIG. 2, Physical Block 218 stores a first block of user data, e.g. Logical Volume 1 Data 220, and a second block of user data, e.g. Logical Volume 2 Data 222. Logical Volume 1 Data 220 is directly ingested user data that was received by the data storage system in a first host I/O write request. Logical Volume 1 Data 220 is user data written to a first logical volume, e.g. Logical Volume 1. For example, Logical Volume 1 Data 220 is a block of user data that is at least as large as a minimum threshold, e.g. at least 1 MB in size. Logical Volume 1 Data 220 was directly ingested to Physical Block 218 in response to the size of Logical Volume 1 Data 220 being at least as large as the minimum threshold.

Logical Volume 2 Data 222 is directly ingested user data that was received by the data storage system in a second host I/O write request. Logical Volume 2 Data 222 is user data written to a second logical volume, e.g. Logical Volume 2. For example, Logical Volume 2 Data 222 is also a block of user data that is at least as large as the minimum threshold, e.g. at least 1 MB in size. Logical Volume 2 Data 222 was directly ingested to Physical Block 218 in response to the size of Logical Volume 2 Data 222 being at least as large as the minimum threshold.

In the example of FIG. 2, Virtual Layer Block 212 has been allocated for Physical Block 218. For example, Virtual Layer Block 212 was allocated for Physical Block 218 in response to an initial flush request indicating user data that was directly ingested into Physical Block 218, e.g. in response to a flush request indicating Logical Volume 1 Data 220. During processing of the first flush request, Virtual Block Pointers 214 were loaded into Virtual Layer Block 212. Each one of the Virtual Block Pointers 214 indicates the physical location of a respective page of user data having a logical block address within Logical Volume 1 Data 220. Further during processing of the initial flush request, Leaf Layer Pointers 204 were loaded into Leaf Node 202. Leaf Node 202 is a leaf layer node within Logical Address Mapping Tree 1 200. Logical Address Mapping Tree 1 200 is a logical address mapping tree maintained for Logical Volume 1. Also, during processing of the initial flush request, a pointer to Virtual Layer Block 212 was stored into the Physical Block Descriptor 230 for Physical Block 218. A pointer to Physical Block Descriptor 230 may also be loaded into Virtual Layer Block 212, such that Virtual Layer Block 212 and Physical Block Descriptor 230 point to each other. Loading Leaf Layer Pointers 204 into Leaf Node 202 binds the pages of user data in Logical Volume 1 Data 220 to logical block addresses in Logical Volume 1. After Leaf Layer Pointers 204 are loaded into Leaf Node 202, Logical Address Mapping Tree 1 200 can be used to find physical locations of pages of user data stored in Logical Volume 1 based on the corresponding logical block addresses of those pages.

During processing of a second flush request, e.g. a flush request indicating Logical Volume 2 Data 222, Virtual Block Pointers 216 were loaded into Virtual Layer Block 212. Each one of the Virtual Block Pointers 216 indicates a physical location of a respective page of user data within Logical Volume 2 Data 222. Further during processing of the second flush request, Leaf Layer Pointers 210 were loaded into Leaf Node 208. Leaf Node 208 is a leaf layer node within Logical Address Mapping Tree 2 206. Logical Address Mapping Tree 2 206 is a logical address mapping tree maintained for Logical Volume 2. Loading Leaf Layer Pointers 210 into Leaf Node 208 binds the pages of user data in Logical Volume 2 Data 222 to logical block addresses in Logical Volume 2. After Leaf Layer Pointers 210 are loaded into Leaf Node 208, Logical Address Mapping Tree 2 206 can be used to find physical locations of pages of user data stored in Logical Volume 2 based on the corresponding logical block addresses of those pages.

Figure 3:
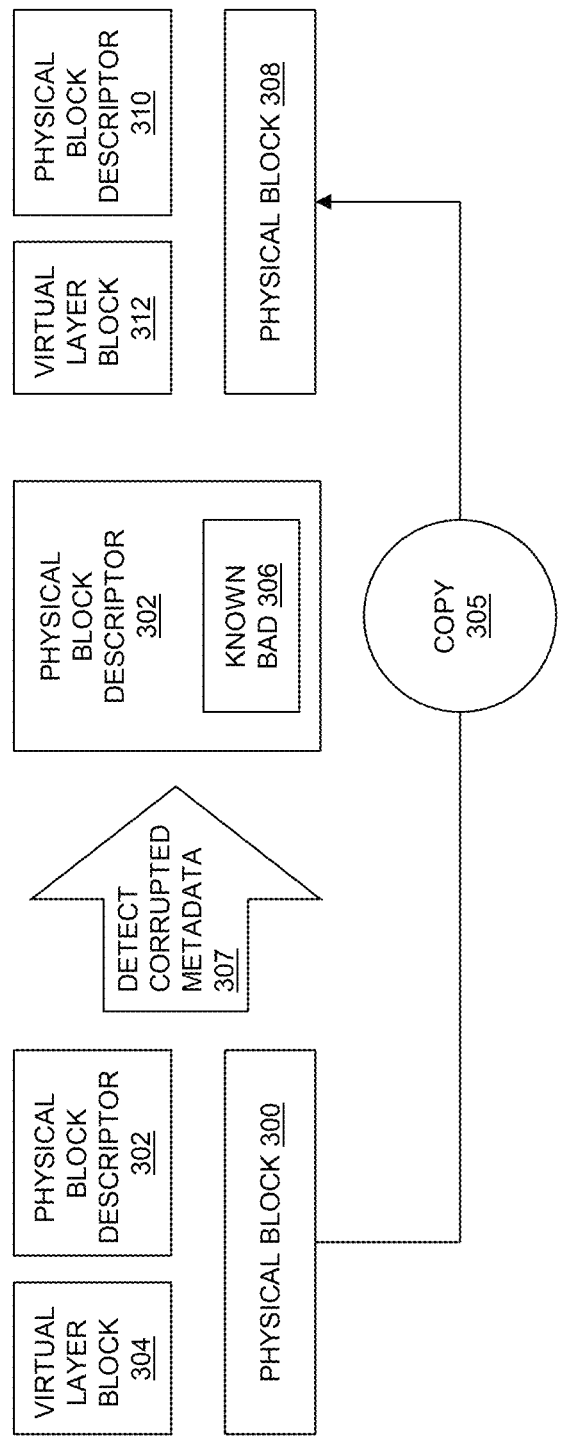
FIG. 3 is a block diagram showing operation of an illustrative embodiment of the disclosed technology during error processing.

FIG. 3 is a block diagram showing operation of an illustrative embodiment of the disclosed technology during error processing. In the example of FIG. 3, a Physical Block 300 has metadata including a corresponding Physical Block Descriptor 302 and previously allocated Virtual Layer Block 304. When a flush request is received, indicating a block of user data to be flushed that was directly ingested into Physical Block 300, the flush logic processing the flush request may detect an error due to data corruption in either Physical Block Descriptor 302 or Virtual Layer Block 304, as illustrated in FIG. 3 by the arrow labeled Detect Corrupted Metadata 307. The error may result from a failed attempt to read Block Descriptor 302 or Virtual Layer Block 304, e.g. due to a checksum failure or the like. In response to detecting the error, the flush logic performs error processing by i) allocating a new physical block, e.g. Physical Block 308, and ii) copying the user data currently stored in Physical Block 300 to Physical Block 308, e.g. as illustrated in FIG. 3 by circle labeled Copy 305. Physical Block 300 is then marked with a KNOWN BAD status indicator 306, e.g. by storing the KNOWN BAD status indicator 306 in Physical Block Descriptor 302. Further during error processing, the flush logic allocates a new virtual layer block, e.g. Virtual Layer Block 312, and obtains a corresponding physical block descriptor for the new physical block, e.g. Physical Block Descriptor 310, that are each to be used with Physical Block 308.

Figure 4:
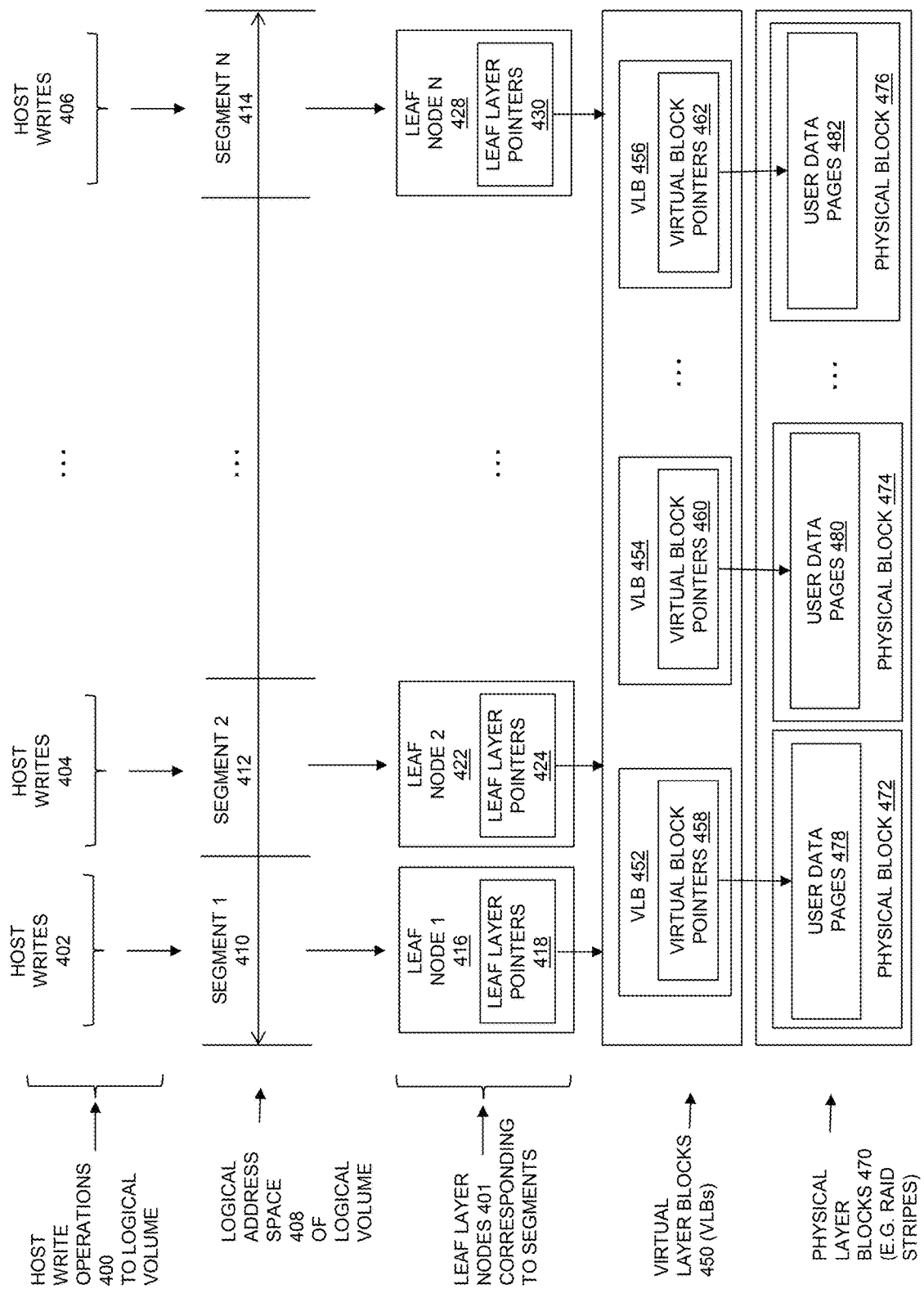
FIG. 4 is a block diagram showing an example of some components in a logical address mapping tree for a logical volume in some embodiments.

FIG. 4 is a block diagram showing an example of segments in a Logical Address Space 408 of a logical volume, and of the corresponding Leaf Layer Nodes 401 in a logical address mapping tree for the logical volume. As shown in FIG. 4, Logical Address Space 408 may be divided into segments, shown by Segment 1 410, Segment 2 412, and so on through Segment N 414. The disclosed technology may be embodied using any specific length of logical address space, and various specific sizes of segments within the logical address space. For example, each segment within Logical Address Space 408 may have a size of 2 MB. In such an example, each leaf layer node may store up to 512 pointers, each of which points to a virtual layer pointer that points to the location at which a page of user data is stored within a physical block. For example, each page of user data may be 4 KB of uncompressed user data.

In the example of FIG. 4, Leaf Node 1 416 corresponds to Segment 1 410, Leaf Node 2 422 corresponds to Segment 2 412, and so on through Leaf Node N 428, which corresponds to Segment N 414.

Each leaf node in the Leaf Layer Nodes 401 contains leaf layer pointers that point to virtual layer pointers contained in Virtual Layer Blocks 450. Virtual Layer Blocks 450 includes some number of virtual layer blocks, shown for purposes of illustration by Virtual Layer Block 452, Virtual Layer Block 454, and so on through Virtual Layer Block 456. Physical Layer Blocks 470 includes some number of physical blocks, shown for purposes of illustration by Physical Block 472, Physical Block 474, and so on through Physical Block 476. Each one of the physical blocks in Physical Layer Blocks 470 is a chunk of non-volatile data storage, e.g. a single RAID stripe, that can be used to store pages of user data. For example, Physical Block 472 is shown storing User Data Pages 478, Physical Block 474 is shown storing User Data Pages 480, and so on through Physical Block 476, which is shown storing User Data Pages 482.

Each virtual layer block in Virtual Layer Blocks 450 corresponds to a respective one of the physical blocks in Physical Layer Blocks 470. For example, Virtual Layer Block 452 corresponds to Physical Block 472, Virtual Layer Block 454 corresponds to Physical Block 474, and so on, through Virtual Layer Block 456, which corresponds to Physical Block 476. The virtual block pointers in a virtual layer block point to respective pages of user data in the corresponding physical block. Accordingly, Virtual Block Pointers 458 in Virtual Layer Block 452 point to User Data Pages 478 in Physical Block 472, Virtual Block Pointers 460 in Virtual Layer Block 454 point to User Data Pages 480 in Physical Block 474, and so on, through Virtual Block Pointers 462 in Virtual Layer Block 456, which point to User Data Blocks 482 in Physical Block 476.

Each virtual block pointer in a virtual layer block points to a page of host data written to the segment or segments of the logical address space corresponding to one or more leaf nodes that include pointers to that pointer. Accordingly, Leaf Node 1 416 contains Leaf Layer Pointers 418 that point to virtual block pointers in the virtual layer blocks of Virtual Layer Blocks 450 that point to data pages in Physical Layer 470 indicated by Host Writes 402, because Host Writes 402 are directed to logical addresses (e.g. logical block addresses sometimes referred to as "LBAs") that fall within Segment 1 410. Leaf Node 2 422 contains Leaf Layer Pointers 424 that point to virtual block pointers in virtual layer blocks of Virtual Layer Blocks 450 that point to data pages in Physical Layer 470 indicated by Host Writes 404, because Host Writes 404 are directed to logical addresses (e.g. "LBAs") that fall within Segment 2 412. The Leaf Level Nodes 401 continue similarly through Leaf Node N 428, which contains Leaf Layer Pointers 430 that point to virtual block pointers in the virtual layer blocks of Virtual Layer Blocks 450 that point to data pages in Physical Layer 470 indicated by Host Writes 406, because Host Writes 406 are directed to logical addresses (e.g. "LBAs") that fall within Segment N 414.

The pointers in each leaf node may be arranged sequentially, in correspondence with an order of LBAs within the corresponding segment of the logical address space. For example, a first pointer in Leaf Layer Pointers 418 may point to a virtual block pointer that points to a data page indicated by a write operation directed to a first LBA within Segment 1 410 (e.g. the lowest LBA in the segment), a second pointer in Leaf Layer Pointers 218 may point to virtual block pointer that points to a data page indicated by a write operation directed to a second LBA within Segment 1 410 (e.g. the second lowest LBA in the segment), and so on.

Figure 5:
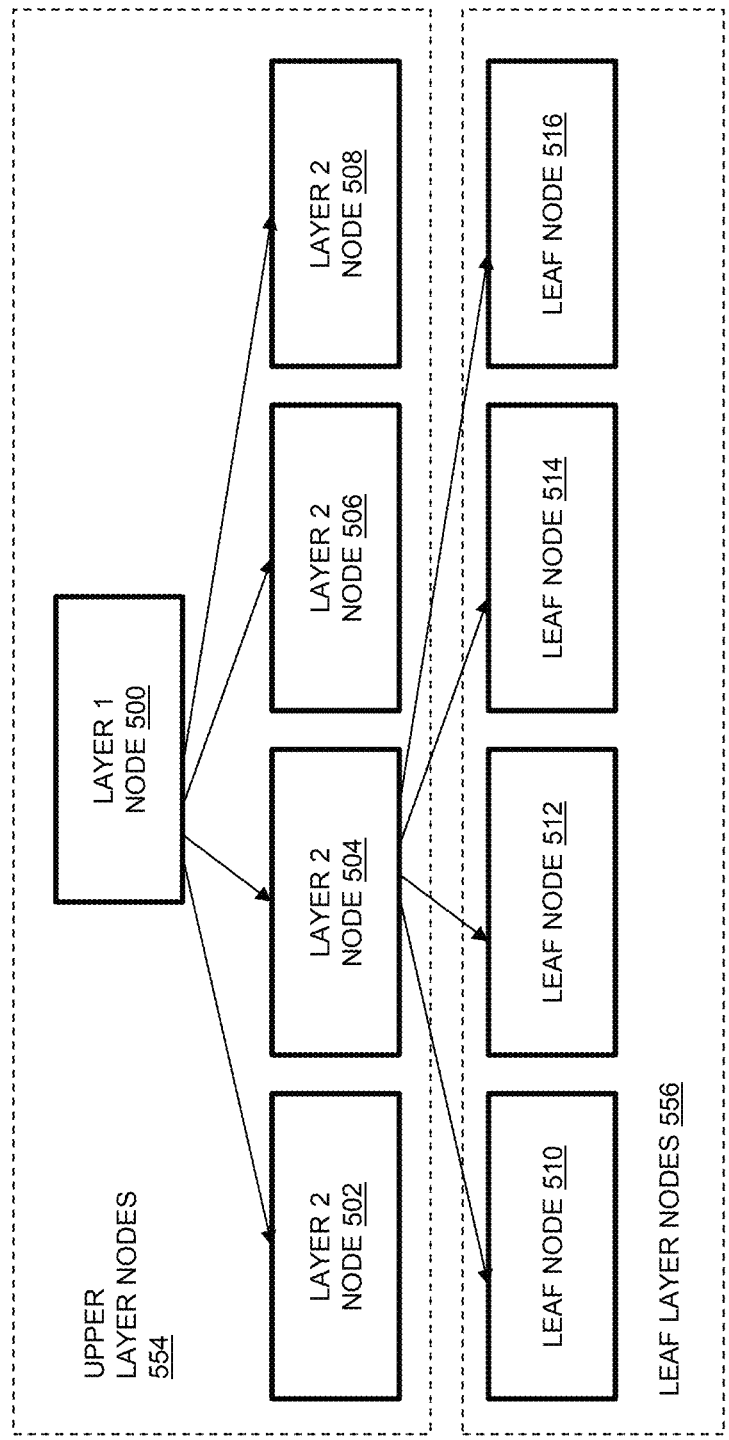
FIG. 5 is a block diagram showing a simplified example of some components in a logical address mapping tree in some embodiments.

FIG. 5 is a block diagram showing a simplified example of upper portions of a logical address mapping tree in some embodiments. In the example of FIG. 5, the Upper Layer Nodes 554 include two layers: a first layer (also referred to as "layer 1"), and a second layer (also referred to as "layer 2"). The first layer is shown including a Layer 1 Node 500. The second layer is shown including Layer 2 Node 502, Layer 2 Node 504, Layer 2 Node 506, and Layer 2 Node

508. The Leaf Layer Nodes 556 include Leaf Node 510, Leaf Node 512, Leaf Node 514, and Leaf Node 516.

In the example of FIG. 5, each layer 1 node may contain pointers to a maximum of N layer 2 nodes, each layer 2 node may contain pointers to a maximum of N layer 3 nodes, e.g. where N=512.

Each leaf node in Leaf Layer Nodes 556 contains pointers to virtual block pointers that point to pages of data. For example, each leaf node in Leaf Layer Nodes 556 may contain a maximum of N (e.g. 512) pointers to virtual block pointers that point to pages of data written to the segment of the logical address space corresponding to that leaf node.

Figure 6:
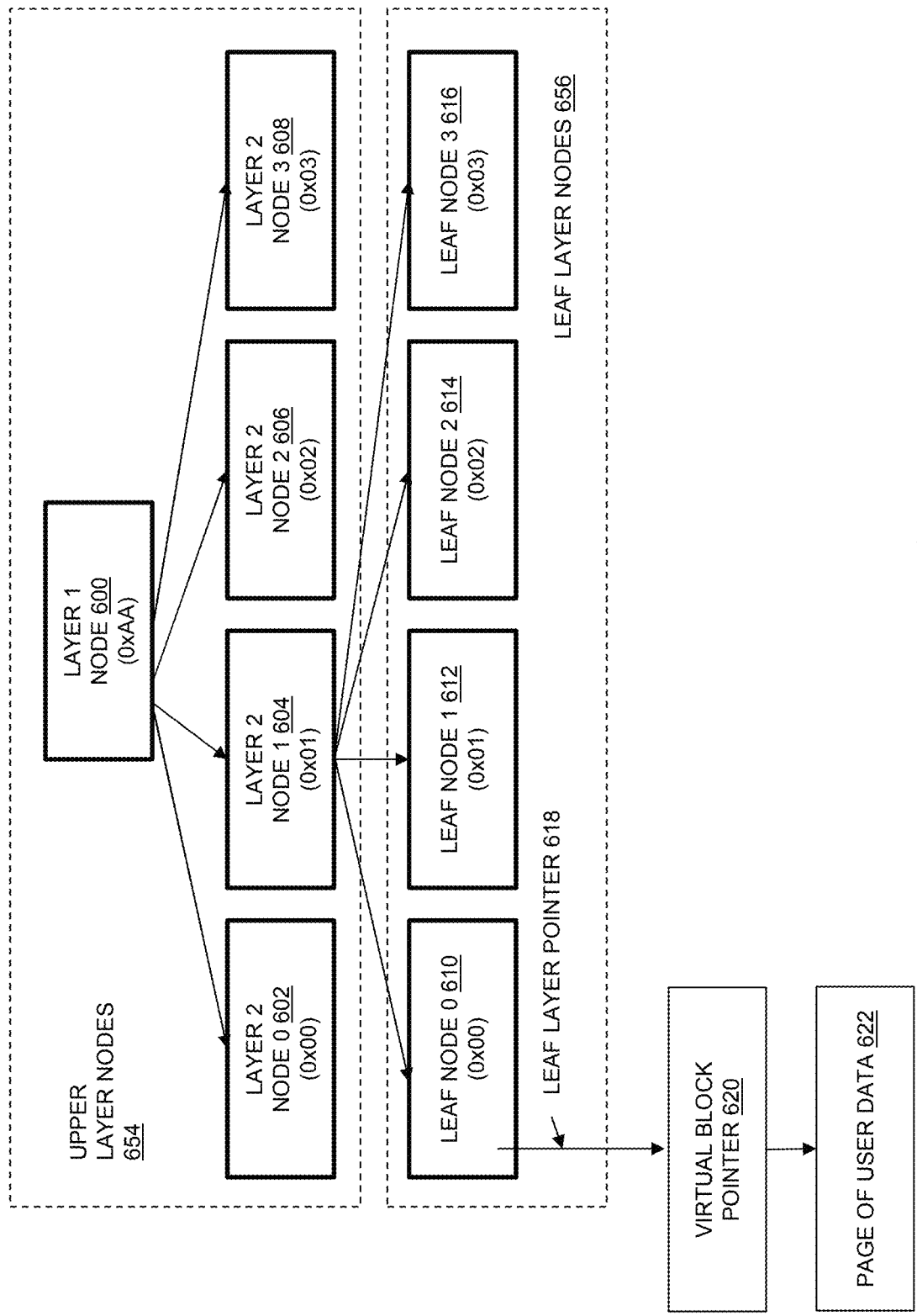
FIG. 6 is a block diagram showing another simplified example of some components in a logical address mapping tree in some embodiments, and illustrating a traversal of the mapper tree to locate a page of user data in non-volatile data storage.

FIG. 6 is a block diagram showing a simplified example of a logical address mapping tree in some embodiments, showing a traversal of the logical address mapping tree to find a page of user data. The Upper Layer Nodes 654 in FIG. 6 include two layers: a first layer (referred to as "layer 1"), and a second layer (referred to as "layer 2"). The first layer is shown including Layer 1 Node 600. The second layer is shown including Layer 2 Node 0 602, Layer 2 Node 1 604, Layer 2 Node 3 606, and Layer 2 Node 4 608. The Leaf Layer Nodes 656 include Leaf Node 0 610, Leaf Node 1 612, Leaf Node 2 614, and Leaf Node 3 616.

In the example of FIG. 6, each node may contain a maximum number of N pointers to nodes in the next lower layer, e.g. N=256. Also, in the example of FIG. 6, each LBA within the logical address space indicates a 4 KB page within the logical address space, and is mapped to the physical location in non-volatile data storage at which that page of user data is stored. Each leaf pointer in a leaf node within the Leaf Layer Nodes 656 points to a virtual block pointer that points to the physical location of a page of user data in the non-volatile data storage. Accordingly, in the example of FIG. 6, each leaf node in Leaf Layer Nodes 656 may contain up to 256 pointers to virtual block pointers that each indicate the physical location of a page of user data in the non-volatile data storage. Accordingly, in the example of FIG. 6, each leaf node in Leaf Layer Nodes 656 corresponds to a 1 MB segment within the logical address space. Each layer 2 node may contain up to 256 pointers to leaf layer nodes in the Leaf Layer Nodes 656, and accordingly each layer 2 node corresponds to 256 MB within the logical address space. Each layer 1 node may contain up to 256 pointers to layer 2 nodes, and accordingly each layer 1 node corresponds to 64 GB within the logical address space.

Further with reference to the example of FIG. 6, the logical addresses within the logical address space may be logical block addresses (LBAs). Each layer 1 node is associated with the highest offset within the LBA, each layer 2 node is associated with a second highest offset within the LBA, and each leaf node in the Leaf Layer Nodes 656 is associated with a third highest offset within the LBA.

For example, to process a read operation directed to LBA 0xAA010000000 within the logical address space of the logical volume, a node in Layer 1 is first visited that corresponds to the value of the highest offset within the LBA, e.g. a node in Layer 1 that corresponds to 0xAA. In FIG. 1, Layer 1 Node 600 corresponds to a highest offset value of 0xAA. To identify the next node to be visited during the traversal (i.e. the node within Layer 2 to be visited after Layer 1 Node 600), a pointer within Layer 1 Node 600 is then located that corresponds to the value of the next highest offset within the LBA. In this example, the value of the next highest offset within the LBA is 0x01, and the pointer in Layer 1 Node 600 is located that corresponds to 0x01, e.g. the pointer in the 0x01 position within the pointers contained in Layer 1 Node 600, which is a pointer to Layer 2 Node 1 604.

A pointer within Layer 2 Node 1 604 is then located that corresponds to the value of the next highest offset within the LBA. In this example, the value of the next highest offset within the LBA is 0x00, and the pointer in Layer 2 Node 604 is located that corresponds to 0x00, e.g. the pointer in the 0x00 position within the pointers contained in Layer 2 Node 604, which is a pointer to Leaf Node 0 610.

A pointer within Leaf Node 0 610 is then located that corresponds to the value of the next highest offset within the LBA. In this example, the value of the next highest offset within the LBA is 0x00, and the pointer in Leaf Node 0 610 is located that corresponds to 0x00, e.g. a Leaf Layer Pointer 618 that is located within the 0x00 position within the pointers contained in Leaf Node 0 610. Leaf Layer Pointer 618 points to Virtual Block Pointer 620. Virtual Block Pointer 620 may be a pointer contained within one of multiple virtual layer blocks in a virtual block layer, similar to Virtual Layer Blocks 450 shown in FIG. 4. Virtual Block Pointer 620 points to a physical location of Page of User Data 622 in non-volatile data storage (e.g. is an offset within the physical block that corresponds to the virtual layer block that contains Virtual Block Pointer 620), which is used to store the page of user data indicated by a previous host I/O write request directed to LBA 0xAA010000000 within the logical address space of the logical volume.

The above example describes using an LBA to locate a page of user data. Those skilled in the art will recognize that the logical address mapping tree may be traversed while processing a host I/O read request directed to an LBA in order to locate a page of user data that is read from non-volatile data storage, and then returned to the host in response to the host I/O read request.

FIG. 7 is a flow chart showing an example of steps performed in some embodiments.

At step 700, a first block of user data is received in a first host I/O write request directed to a first logical volume. The first block of user data is stored directly into a physical block of non-volatile data storage in response to the size of the first block of user data being at least as large as a minimum threshold size. In this way the first block of user data is directly ingested into the non-volatile data storage, bypassing a separate cache.

At step 702, a second block of user data is received in a second host I/O write request directed to a second logical volume. The second block of user data is stored directly into the physical block of non-volatile data storage, again in response to the size of the second block of user data being at least as large as a minimum threshold size. In this way the second block of user data is also directly ingested into the non-volatile data storage, bypassing the separate cache.

At step 704, a first flush request is received. The first flush request indicates the first block of user data stored in the physical block.

At step 706, in response to the first flush request, in response to determining that the first flush request is the initial flush request received with regard to user data stored in the physical block, the flush logic allocates a virtual layer block for the physical block.

At step 708, further in response to the first flush request, the flush logic stores a first set of virtual block pointers into the allocated virtual layer block. Each one of the virtual block pointers in the first set of virtual block pointers indicates a respective page of user data in the first block of user data stored in the physical block.

At step 710, also in response to the first flush request, the flush logic stores pointers into a leaf node of a first logical address mapping tree. The first logical address mapping tree is maintained to map logical block addresses in the first logical volume to physical addresses of pages of user data. Each one of the pointers indicates a respective one of the virtual block pointers in the first set of virtual block pointers, thereby binding the pages of user data in the first block of user data to corresponding logical block addresses in the first logical volume.

At step 712, a second flush request is received. The second flush request indicates the second block of user data stored in the physical block.

At step 714, in response to the second flush request, the flush logic identifies the virtual layer block that was previously allocated for the physical block, e.g. through a pointer to the virtual layer block stored in a physical block descriptor corresponding to the physical block. The existence of the pointer in the physical block descriptor, which points to the previously allocated virtual layer block, indicates that the second flush request is not the initial flush request received indicating user data stored in the physical block, and accordingly indicates that a virtual layer block has already been allocated for the physical block.

At step 716, further in response to the second flush request, the flush logic stores a second set of virtual block pointers into the virtual layer block. Each one of the virtual block pointers in the second set of virtual block pointers indicates a respective page of user data in the second block of user data.

At step 718, also in response to the second flush request, the flush logic stores pointers into a leaf node of a second logical address mapping tree. The second logical address mapping tree is maintained to map logical block addresses in the second logical volume to physical addresses of pages of user data. Each one of the pointers indicates a respective one of the virtual block pointers in the second set of virtual block pointers, thereby binding the pages of user data in the second block of user data to corresponding logical block addresses in the second logical volume.

As will be appreciated by those skilled in the art, aspects of the technology disclosed herein may be embodied as a system, method, or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
   receiving a first flush request indicating a first block of user data to be flushed;
   in response to detecting that the first block of user data was, when it was received, directly stored into a physical block of non-volatile data storage, detecting whether the first flush request is an initial flush request indicating user data directly stored into the physical block of non-volatile data storage;
   in response to detecting that the first flush request is the initial flush request indicating user data directly stored into the physical block of non-volatile data storage, allocating a virtual layer block for the physical block of non-volatile data storage;
   storing, in the virtual layer block, a first set of virtual block pointers, wherein the first set of virtual block pointers indicate locations of respective pages of the first block of user data within the physical block of the non-volatile data storage; and
   storing, in at least one leaf layer node of a first logical address mapping tree, pointers to the virtual block pointers in the first set of virtual block pointers stored in the virtual layer block.

2. The method of claim 1, further comprising:
   receiving a second flush request indicating a second block of user data to be flushed;

in response to detecting that the second block of user data was, when it was received, directly stored into the physical block of non-volatile data storage, detecting whether the second flush request is the initial flush request indicating user data directly stored into the physical block of non-volatile data storage;

in response to detecting that the second flush request is not the initial flush request indicating user data directly stored into the physical block of non-volatile data storage, identifying the virtual layer block previously allocated for the physical block of non-volatile data storage;

storing, in the virtual layer block, a second set of virtual block pointers, wherein the second set of virtual block pointers indicate locations of respective pages of the second block of user data within the physical block of the non-volatile data storage; and storing, in at least one leaf layer node of a second logical address mapping tree, pointers to the virtual block pointers in the second set of virtual block pointers stored in the virtual layer block.

3. The method of claim 2, wherein the first block of user data was received in a first host I/O write request directed to a first logical volume;

wherein the first logical address mapping tree maps logical block addresses in the first logical volume to locations in the non-volatile data storage;

wherein the second block of user data was received in a second host I/O write request directed to a second logical volume; and wherein the second logical address mapping tree maps logical block addresses in the second logical volume to locations in the non-volatile data storage.

4. The method of claim 3, wherein storing, in the leaf layer node of the first logical address mapping tree, the pointers to the virtual block pointers in the first set of virtual block pointers stored in the virtual layer block, enables access to the pages of the first block of user data within the physical block of the non-volatile data storage using respective ones of the logical block addresses in the first logical volume; and wherein storing, in the leaf layer node of the second logical address mapping tree, the pointers to the virtual block pointers in the second set of virtual block pointers stored in the virtual layer block, enables access to the pages of the second block of user data within the physical block of the non-volatile data storage using respective ones of the logical block addresses in the second logical volume.

5. The method of claim 4, wherein the first block of user data was directly stored into the physical block of non-volatile data storage in response to detecting that a size of the first block of user data is at least as large as a minimum threshold; and wherein the second block of user data was directly stored into the physical block of non-volatile data storage in response to detecting that a size of the second block of user data is at least as large as the minimum threshold.

6. The method of claim 5, wherein directly storing the first block of user data and the second block of user data into the physical block of non-volatile data storage bypasses a non-volatile cache.

7. The method of claim 6, wherein the non-volatile data storage is configured as a RAID (Redundant Array of Independent Disks); and wherein the physical block of non-volatile data storage comprises a single RAID stripe.

8. The method of claim 1, further comprising:

receiving a second flush request indicating a second block of user data to be flushed, wherein the second block of user data was, when it was received, directly stored into the physical block of non-volatile data storage; and in response to detecting an error in metadata for the physical block of non-volatile data storage, allocating a new physical block of non-volatile data storage, moving user data stored in the physical block of non-volatile data storage to the new physical block of non-volatile data storage, and marking the physical block of physical data storage as known bad.

9. The method of claim 8, wherein the metadata for the physical block of non-volatile data storage comprises a physical block descriptor for the physical block of non-volatile data storage, and further comprising:

allocating a new virtual layer block and a new physical block descriptor for the new physical block of non-volatile data storage.

10. A data storage system, comprising:

processing circuitry and memory coupled to the processing circuitry, the memory storing instructions, wherein the instructions, when executed by the processing circuitry, cause the processing circuitry to:

receive a first flush request indicating a first block of user data to be flushed;

in response to detecting that the first block of user data was, when it was received, directly stored into a physical block of non-volatile data storage, detect whether the first flush request is an initial flush request indicating user data directly stored into the physical block of non-volatile data storage;

in response to detecting that the first flush request is the initial flush request indicating user data directly stored into the physical block of non-volatile data storage, allocate a virtual layer block for the physical block of non-volatile data storage;

store, in the virtual layer block, a first set of virtual block pointers, wherein the first set of virtual block pointers indicate locations of respective pages of the first block of user data within the physical block of the non-volatile data storage; and store, in at least one leaf layer node of a first logical address mapping tree, pointers to the virtual block pointers in the first set of virtual block pointers stored in the virtual layer block.

11. The data storage system of claim 10, wherein the instructions, when executed by the processing circuitry, further cause the processing circuitry to:

receive a second flush request indicating a second block of user data to be flushed;

in response to detecting that the second block of user data was, when it was received, directly stored into the physical block of non-volatile data storage, detect whether the second flush request is the initial flush request indicating user data directly stored into the physical block of non-volatile data storage;

in response to detecting that the second flush request is not the initial flush request indicating user data directly stored into the physical block of non-volatile data storage, identify the virtual layer block previously allocated for the physical block of non-volatile data storage;

store, in the virtual layer block, a second set of virtual block pointers, wherein the second set of virtual block pointers indicate locations of respective pages of the second block of user data within the physical block of the non-volatile data storage; and store, in at least one leaf layer node of a second logical address mapping tree, pointers to the virtual block pointers in the second set of virtual block pointers stored in the virtual layer block.

12. The data storage system of claim 11, wherein the first block of user data was received in a first host I/O write request directed to a first logical volume;

wherein the first logical address mapping tree maps logical block addresses in the first logical volume to locations in the non-volatile data storage;

wherein the second block of user data was received in a second host I/O write request directed to a second logical volume; and wherein the second logical address mapping tree maps logical block addresses in the second logical volume to locations in the non-volatile data storage.

13. The data storage system of claim 12, wherein storing, in the leaf layer node of the first logical address mapping tree, the pointers to the virtual block pointers in the first set of virtual block pointers stored in the virtual layer block, enables access to the pages of the first block of user data within the physical block of the non-volatile data storage using respective ones of the logical block addresses in the first logical volume; and wherein storing, in the leaf layer node of the second logical address mapping tree, the pointers to the virtual block pointers in the second set of virtual block pointers stored in the virtual layer block, enables access to the pages of the second block of user data within the physical block of the non-volatile data storage using respective ones of the logical block addresses in the second logical volume.

14. The data storage system of claim 13, wherein the first block of user data was directly stored into the physical block of non-volatile data storage in response to detecting that a size of the first block of user data is at least as large as a minimum threshold; and wherein the second block of user data was directly stored into the physical block of non-volatile data storage in response to detecting that a size of the second block of user data is at least as large as the minimum threshold.

15. The data storage system of claim 14, wherein directly storing the first block of user data and the second block of user data into the physical block of non-volatile data storage bypasses a non-volatile cache.

16. The data storage system of claim 15, wherein the non-volatile data storage is configured as a RAID (Redundant Array of Independent Disks); and wherein the physical block of non-volatile data storage comprises a single RAID stripe.

17. The data storage system of claim 10, where the instructions, when executed by the processing circuitry, further cause the processing circuitry to:

receive a second flush request indicating a second block of user data to be flushed, wherein the second block of user data was, when it was received, directly stored into the physical block of non-volatile data storage; and in response to detecting an error in metadata for the physical block of non-volatile data storage, allocate a new physical block of non-volatile data storage, moving user data stored in the physical block of non-volatile data storage to the new physical block of non-volatile data storage, and mark the physical block of physical data storage as known bad.

18. The data storage system of claim 17, wherein the metadata for the physical block of non-volatile data storage comprises a physical block descriptor for the physical block of non-volatile data storage, and wherein the instructions, when executed by the processing circuitry, further cause the processing circuitry to:

allocate a new virtual layer block and a new physical block descriptor for the new physical block of non-volatile data storage.

19. A computer program product, comprising:

a non-transitory, computer-readable medium having instructions stored thereon that, when executed by processing circuitry in a data storage system, cause the processing circuitry to perform a method comprising the steps of:

receiving a first flush request indicating a first block of user data to be flushed;

in response to detecting that the first block of user data was, when it was received, directly stored into a physical block of non-volatile data storage, detecting whether the first flush request is an initial flush request indicating user data directly stored into the physical block of non-volatile data storage;

in response to detecting that the first flush request is the initial flush request indicating user data directly stored into the physical block of non-volatile data storage, allocating a virtual layer block for the physical block of non-volatile data storage;

storing, in the virtual layer block, a first set of virtual block pointers, wherein the first set of virtual block pointers indicate locations of respective pages of the first block of user data within the physical block of the non-volatile data storage; and storing, in at least one leaf layer node of a first logical address mapping tree, pointers to the virtual block pointers in the first set of virtual block pointers stored in the virtual layer block.

* * * * *